United States Patent

Siegel

[11] 3,843,623
[45] Oct. 22, 1974

[54] 2-HYDROXY-5-LOWER ALKYL-4'[4-LOWER ALKOXY-6-SULPHO OR SULPHATO-HYDROCARBYLAMINO-1:3:5-TRIAZINE-2-YLAMINO]-AZOBENZENE

[75] Inventor: Edgar Siegel, Leverkusen-Steinbuchel, Germany

[73] Assignee: Bayer Aktiengesellschaft, Leverkusen, Germany

[22] Filed: Jan. 18, 1972

[21] Appl. No.: 218,832

[30] Foreign Application Priority Data
Jan. 18, 1971  Germany............ 2102174

[52] U.S. Cl............................. 260/153, 260/249.8
[51] Int. Cl............................................. C09b 43/16
[58] Field of Search..................................... 260/153

[56] References Cited
UNITED STATES PATENTS

| 2,945,021 | 7/1960 | Fasciati et al. | 260/153 |
| 2,945,022 | 7/1960 | Fasciati et al. | 260/153 |
| 3,527,747 | 9/1970 | Mangini et al. | 260/153 |
| 3,658,783 | 4/1972 | Knobloch et al. | 260/153 |

FOREIGN PATENTS OR APPLICATIONS

| 825,377 | 12/1959 | Great Britain | 260/153 |

Primary Examiner—Lorraine A. Weinberger
Assistant Examiner—C. F. Warren
Attorney, Agent, or Firm—Plumley & Tyner

[57] ABSTRACT

Monoazo dyestuffs which in the form of the free acid correspond to the general formula

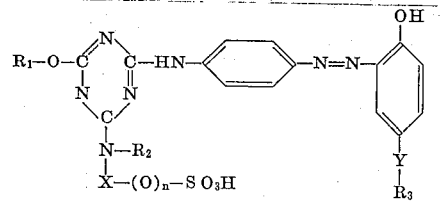

in which
$R_1$ represents an alkyl radical,
$R_2$ represents hydrogen or alkyl,
$R_3$ represents an alkyl, aryl or aralkyl radical,
X represents an alkylene, aralkylene or arylene radical,
Y represents a direct bond or —O—,
n represents 0 or 1 and their use for dyeing natural and synthetic fibre materials, especially for dyeing polyamide fibres. Dyeings obtained show very good fastness to light.

8 Claims, No Drawings

2-HYDROXY-5-LOWER ALKYL-4'[4-LOWER ALKOXY-6-SULPHO OR SULPHATO-HYDROCARBYLAMINO-1:3:5-TRIAZINE-2-YLAMINO]-AZOBENZENE

The subject of the present invention are new triazinylamino-monoazo dyestuffs which in the form of the free acid correspond to the general formula

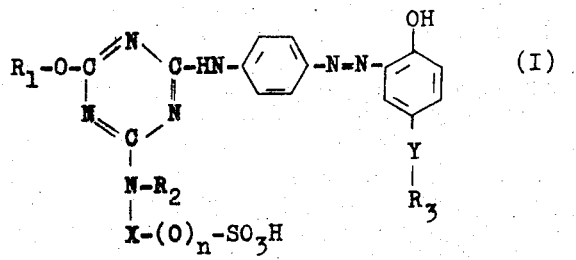

as well as their manufacture and use for dyeing synthetic fibre materials, especially fibre materials of polyamides.

In the general formula (I),
$R_1$ represents an alkyl radical,
$R_2$ represents hydrogen or an alkyl radical,
$R_3$ represents an alkyl, aryl or aralkyl radical,
X represents an alkylene, aralkylene or arylene radical,
Y represents a direct bond or —O— and
$n$ represents 0 or 1.

The radicals $R_1$, $R_2$, $R_3$ and X can optionally possess non-ionic substituents, for example halogen, such as chlorine and bromine, hydroxyl and alkoxy, especially $C_1$ - $C_4$-alkoxy.

Preferred alkyl radicals $R_1$ are those with 1-4 C atoms, such as methyl, ethyl, n- and i-propyl and n-, i- and tert.-butyl radicals. These can be substituted, for example by hydroxyl, methoxy or ethoxy groups or by halogen, such as chlorine or bromine.

Preferred alkyl radicals $R_2$ are those with 1-4 C atoms. As examples there may be mentioned: —$CH_3$, —$C_2H_5$, —$C_3H_7$ and —$C_4H_9$. Particularly suitable alkyl radicals $R_3$ are those with 1-4 C atoms, for example methyl, ethyl, n-propyl and tert.-butyl radicals. These can, for example, be substituted by hydroxyl or methoxy groups or by halogen, such as chlorine or bromine.

Suitable aryl radicals $R_3$ are, for example, phenyl, and phenyl radicals substituted by methyl, methoxy or chlorine in the o-, m- or p-position.

Examples of suitable aralkyl radicals $R_3$ are the benzyl or β-phenylethyl radical.

Suitable alkylene radicals X are especially those with 1-4 C atoms which can optionally possess substituents, for example hydroxyl groups. Such radicals are, for example:

$-CH_2-CH_2-$, $-CH_2-CH_2-CH_2-$, $-CH_2-CH-CH_2-$, $-CH_2-CH-$,
                                              |                    |
                                              OH                   $CH_3$ $-CH_2-CH_2-CH_2-CH_2-$, $-C-CH_2-$ and $-CH_2-CH_2-CH-$.
                           |                              |
                          $CH_3$                         $CH_3$
                          |
                         $CH_3$ Suitable aralkylene radicals X are, for example:

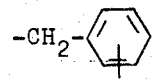

and suitable arylene radicals are, for example:

, or

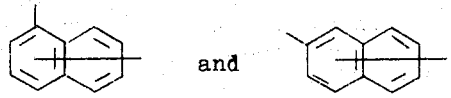

Preferred dyestuffs are those of the general formula:

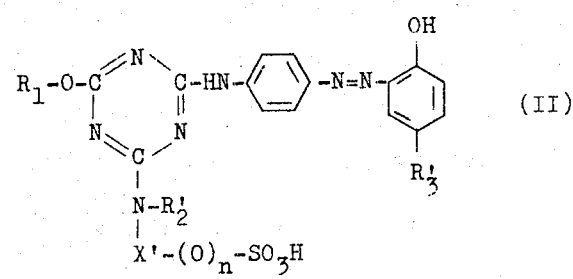

wherein
$R_1$ has the meaning indicated in the formula (1),
$R_2'$ represents hydrogen or $C_1$–$C_4$-alkyl,
$R_3'$ denotes a $C_1$–$C_4$-alkyl radical,
X' represents an ethylene radical in which case $n = 0$ or 1, or
X' represents a phenylene or benzylene radical, in which case $n = 0$.

The new dyestuffs of the general formula (I) can be manufactured according to various processes.

One process is that, successively and in optional sequence, 1 mol of a cyanuric halide is reacted with a. 1 mol of an alcohol $R_1$—OH
b. 1 mol of an amino $R_2$—NH—X—(O)$_n$ —$SO_3$H and c. 1 mol of an aminoazo dyestuff of the formula

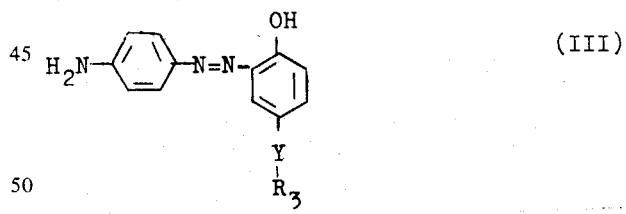

wherein
$R_1$, $R_2$, $R_3$, X and Y have the meaning indicated in the formula I,
in the presence of acid-binding agents. In this process it is advantageous if the cyanuric halide is reacted in the sequence (a) (c) (b) with the reactants mentioned.

A further process is characterised in that amines of the general formula

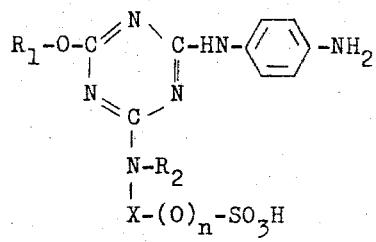 (IV)

in which

R₁, R₂, X and $n$ have the abovementioned meaning, are diazotised and coupled with phenols of the formula

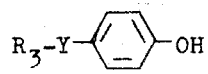 (V)

in which

R₃ and Y have the abovementioned meaning.

Cyanuric chloride is preferably used as the cyanuric halide.

Suitable alcohols R₁—OH are, for example: methyl alcohol, ethyl alcohol, n-propyl alcohol, i-propyl alcohol, n-butyl alcohol, i-butyl alcohol, t-butyl alcohol, ethylene glycol, 2-methoxy-ethanol, 2-ethoxy-ethanol and 2-chloroethanol.

Suitable amines R₂—NH—X—(O)ₙ—SO₃H are, for example: 2-amino-ethanesulphonic acid, 2-methylamino-ethanesulphonic acid, 2-butylamino-ethanesulphonic acid, 3-amino-propanesulphonic acid, 3-amino-2-hydroxy-propanesulphonic acid, 3-methylamino-propanesulphonic acid, 3-ethylamino-propanesulphonic acid, 4-amino-butanesulphonic acid, 2-amino-1,1-dimethyl-ethanesulphonic acid, 3-amino-3-methyl-propanesulphonic acid, 2-aminoethanol-sulphate, 3-aminopropanol-sulphate, 2-benzylamine-1-sulphonic acid, 3-benzylamine-1-sulphonic acid, 4-benzylamine-1-sulphonic acid, 4-aminobenzyl-1-sulphonic acid, 2-aminobenzene-1-sulphonic acid, 3-aminobenzene-1-sulphonic acid, 4-aminobenzene-1-sulphonic acid, 3-aminobenzyl-1-sulphonic acid, 1-aminonaphthalene-2-sulphonic acid, 1-aminophthalene-4-sulphonic acid, 1-aminonaphthalene-6-sulphonic acid, 2-aminonaphthalene-4-sulphonic acid and 2-aminonaphthalene-7-sulphonic acid.

Possible coupling components (V) are: 4-methyl-phenol, 4-ethyl-phenol, 4-i-propyl-phenol, 4-n-butyl-phenol, 4-i-butyl-phenol, 4-t-butyl-phenol, 4-(2-hydroxyethyl)-phenol, 4-methoxy-phenol, 4-phenoxy-phenol, 4-benzyl-phenol, 4-(2-phenylethyl-phenol and 4-hydroxy-diphenyl.

The dyestuffs of the formula (I) with $n = 1$ and X = alkylene can be manufactured particularly effectively if amines of the formula

HO—X—NH—R₂ (VI)

wherein

R₂ has the abovementioned meaning are employed and, in the dyestuffs thus obtained, of the formula

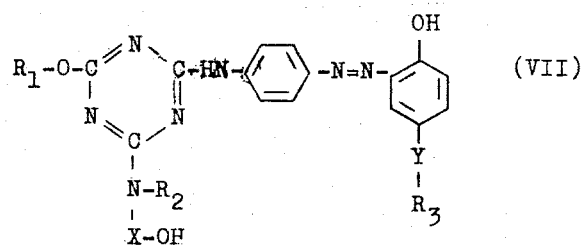 (VII)

wherein

R₁, R₂, R₃ and Y have the meaning indicated in the formula (I) and

X represents alkylene, the aliphatic hydroxyl group is esterified with sulphuric acid.

Suitable amines of the formula (VI) are, for example: ethanolamine, N-methyl-ethanolamine, N-ethyl-ethanolamine, 3-amino-1-propanol, 3-n-methylamino-1-propanol, 1-amino-2-propanol, 4-amino-1-butanol and 4-N-methylamino-1-butanol.

The dyestuffs according to the invention are suitable for dyeing natural and synthetic fibre materials, especially for dyeing polyamide fibres in level, strong, yellow shades of very good fastness to light. They are well absorbed on polyamide fibres even in a neutral to weakly acid dyebath. By polyamide fibres there are here especially understood those of synthetic polyamides, such as ε-polycaprolactam or condensation products of adipic acid and hexamethylenediamine.

Example 1

20.5 parts of cyanuric chloride are added, at 8°, to a mixture of 75.6 parts of methyl alcohol and 18.9 parts of sodium bicarbonate and this suspension is stirred for 5 hours at 8°–10°. Thereafter, 62 parts of water and a solution of 22.7 parts of 4-amino-2'-hydroxy-5-methyl-1,1'-azobenzene in 150 parts of methyl alcohol are added to this mixture. After stirring for a further hour at 25°–30°, 36.8 parts of sodium 2-amino-ethanesulphonate dissolved in 100 parts of water are added, the mixture is warmed to the boil (65°) and heated for 1 hour under reflux, and the methyl alcohol is subsequently distilled off. The dyestuff of the formula:

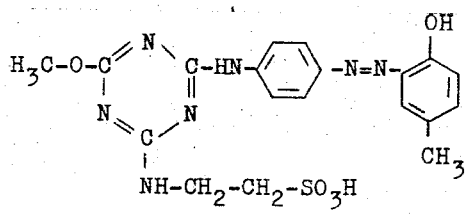

which crystallises out in good yield is filtered off and dried. It dyes polyamide fibres or polyamide fabrics, from a weakly acid or neutral bath, in a yellow colour shade of very good fastness to light.

The table which follows describes further valuable yellow dyestuffs which can be manufactured in accordance with the above process. They correspond to the composition

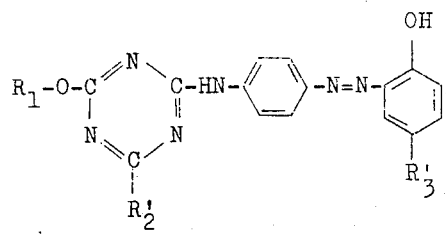

The meaning of $R_1$, $R_2'$ and $R_3'$ is shown in the appropriately marked columns of the table.

| Example No. | $R_1$ | $R_2'$ | $R_3'$ |
|---|---|---|---|
| 2 | $-CH_3$ | $-N(CH_3)(CH_2-CH_2-SO_3H)$ | $-CH_3$ |
| 3 | " | $-N(C_2H_5)(CH_2-CH_2-SO_3H)$ | " |
| 4 | " | $-N(C_3H_7(n))(CH_2-CH_2-SO_3H)$ | " |
| 5 | " | $-N(C_3H_7(i))(CH_2-CH_2-SO_3H)$ | " |
| 6 | " | $-N(C_4H_9(n))(CH_2-CH_2-SO_3H)$ | " |
| 7 | " | $-NH-CH_2-CH_2-CH_2-SO_3H$ | " |
| 8 | " | $-NH-CH_2-CH(OH)-CH_2-SO_3H$ | " |
| 9 | " | $-N(CH_3)(CH_2-CH_2-CH_2-SO_3H)$ | " |
| 10 | " | $-N(C_2H_5)(CH_2-CH_2-CH_2-SO_3H)$ | " |
| 11 | " | $-NH-CH_2-CH_2-CH_2-CH_2-SO_3H$ | " |
| 12 | $-CH_3$ | $-NH-CH(CH_3)-CH_2-CH_2-SO_3H$ | $-CH_3$ |
| 13 | " | $-NH-CH_2-CH_2-O-SO_3H$ | " |
| 14 | " | $-N(CH_3)(CH_2-CH_2-O-SO_3H)$ | " |
| 15 | " | $-N(C_2H_5)(CH_2-CH_2-O-SO_3H)$ | " |

| Example No. | $R_1$ | $R_2'$ | $R_3'$ |
|---|---|---|---|
| 16 | " | $-NH-CH_2-CH_2-CH_2-O-SO_3H$ | " |
| 17 | " | $-N(CH_3)(CH_2-CH_2-CH_2-O-SO_3H)$ | " |
| 18 | " | $-NH-CH_2-CH(CH_3)-O-SO_3H$ | " |
| 19 | " | $-NH-CH_2-CH_2-CH_2-CH_2-O-SO_3H$ | " |
| 20 | " | $-N(CH_3)(CH_2-CH_2-CH_2-CH_2-O-SO_3H)$ | " |
| 21 | " | $-NH-C(CH_3)_2-CH_2-O-SO_3H$ | " |
| 22 | " | $-NH-C_6H_4(o\text{-}SO_3H)$ | " |
| 23 | " | $-NH-C_6H_4(m\text{-}SO_3H)$ | " |
| 24 | " | $-NH-C_6H_4-SO_3H$ | " |
| 25 | " | $-NH-C_6H_4(o\text{-}CH_2-SO_3H)$ | " |
| 26 | $-CH_3$ | $-NH-C_6H_4(m\text{-}CH_2-SO_3H)$ | $-CH_3$ |
| 27 | " | $-NH-C_6H_4-CH_2-SO_3H$ | " |
| 28 | " | $-NH-CH_2-C_6H_4-SO_3H$ | " |
| 29 | " | -NH-(4-sulfo-1-naphthyl) | " |
| 30 | " | -HN-(naphthyl-SO_3H) | " |
| 31 | " | -HN-(naphthyl-SO_3H) | " |

| Example No. | $R_1$ | $R_2'$ | $R_3'$ |
|---|---|---|---|
| 32 | " | 6-amino-naphthalene-1-sulfonic acid (-HN-naphthyl-SO$_3$H) | " |
| 33 | " | 7-amino-naphthalene-2-sulfonic acid (HN-naphthyl-SO$_3$H) | " |
| 34 | $-C_2H_5$ | $-NH-CH_2-CH_2-SO_3H$ | " |
| 35 | " | $-NH-CH_2-CH_2-O-SO_3H$ | " |
| 36 | " | $-N(CH_3)(CH_2-CH_2-O-SO_3H)$ | " |
| 37 | $-C_3H_7(n)$ | $-N(CH_3)(CH_2-CH_2-SO_3H)$ | " |
| 38 | " | $-NH-CH_2-CH_2-CH_2-O-SO_3H$ | " |
| 39 | $-C_3H_7(i)$ | $-NH-CH_2-CH_2-SO_3H$ | " |
| 40 | $-C_4H_9(n)$ | $-NH-CH_2-CH_2-SO_3H$ | $-CH_3$ |
| 41 | " | $-N(CH_3)(CH_2-CH_2-O-SO_3H)$ | " |
| 42 | $-C_4H_9(tert)$ | $-NH-CH_2-CH_2-SO_3H$ | " |
| 43 | " | $-NH-CH_2-CH_2-O-SO_3H$ | " |
| 44 | " | $-N(C_2H_5)(CH_2-CH_2-O-SO_3H)$ | " |
| 45 | $-CH_2-CH_2-OH$ | $-NH-CH_2-CH_2-O-SO_3H$ | " |
| 46 | " | $-N(CH_3)(CH_2-CH_2-SO_3H)$ | " |
| 47 | $-CH_2-CH_2-O-CH_3$ | $-NH-CH_2-CH_2-SO_3H$ | " |
| 48 | " | $-N(CH_3)(CH_2-CH_2-SO_3H)$ | " |
| 49 | " | $-N(C_4H_9(n))(CH_2-CH_2-SO_3H)$ | " |
| 50 | " | $-NH-CH_2-CH_2-CH_2-SO_3H$ | " |
| 51 | " | $-NH-CH_2-CH_2-O-SO_3H$ | " |
| 52 | " | $-N(CH_3)(CH_2-CH_2-O-SO_3H)$ | " |

| Example No. | $R_1$ | $R_2'$ | $R_3'$ |
|---|---|---|---|
| 53 | " | -NH-C₆H₄-SO₃H | " |
| 54 | -CH₃ | -NH-CH₂-CH₂-SO₃H | -C₂H₅ |
| 55 | " | -NH-CH₂-CH₂-O-SO₃H | " |
| 56 | -C₂H₅ | -NH-CH₂-CH₂-SO₃H | -C₃H₇(n) |
| 57 | -CH₃ | -N(CH₃)(CH₂-CH₂-O-SO₃H) | -C₃H₇(n) |
| 58 | " | -NH-CH₂-CH₂-O-SO₃H | -C₃H₇(i) |
| 59 | " | -N(CH₃)(CH₂-CH₂-SO₃H) | -C₄H₉(n) |
| 60 | " | -NH-CH₂-CH₂-O-SO₃H | " |
| 61 | " | -N(CH₃)(CH₂-CH₂-SO₃H) | -C₄H₉(i) |
| 62 | " | -NH-CH₂-CH₂-SO₃H | -C₄H₉(t) |
| 63 | " | -N(C₄H₉)(CH₂-CH₂-SO₃H) | " |
| 64 | -CH₂-CH₂-O-CH₃ | -N(CH₃)(CH₂-CH₂-O-SO₃H) | " |
| 65 | -CH₃ | -NH-C(CH₃)₂-CH₂-O-SO₃H | " |
| 66 | -C₃H₇(n) | -NH-CH₂-CH₂-CH₂-SO₃H | -CH₂-CH₂-OH |
| 67 | -CH₃ | -N(C₄H₉)(CH₂-CH₂-SO₃H) | " |
| 68 | " | -NH-CH₂-CH₂-SO₃H | -OCH₃ |
| 69 | -C₃H₇(i) | -N(CH₃)(CH₂-CH₂-SO₃H) | " |
| 70 | -CH₃ | -NH-CH₂-CH₂-SO₃H | -O-C₆H₅ |
| 71 | " | -NH-CH₂-CH₂-O-SO₃H | " |
| 72 | -CH₃ | -N(CH₃)(CH₂-CH₂-SO₃H) | -C₆H₅ |

| Example No. | $R_1$ | $R_2'$ | $R_3'$ |
|---|---|---|---|
| 73 | " | -NH-CH$_2$-CH$_2$-CH$_2$-O-SO$_3$H | " |
| 74 | " | -NH-CH$_2$-CH$_2$-SO$_3$H | -CH$_2$-C$_6$H$_5$ |
| 75 | " | -N(CH$_3$)(CH$_2$-CH$_2$-O-SO$_3$H) | " |
| 76 | " | -N(CH$_3$)(CH$_2$-CH$_2$-SO$_3$H) | -CH$_2$-CH$_2$-C$_6$H$_5$ |
| 77 | " | -NH-CH$_2$-CH$_2$-O-SO$_3$H | " |

Example 78

35.4 parts of 2-(4'-aminophenyl)-amino-4-methoxy-6-(N-methyl-N-β-sulphoethyl)-amino-s-triazine (manufactured from methoxy-dichloro-s-triazine by reaction with N-methyl-taurine and N-acetyl-p-phenylenediamine, with subsequent saponification of the acetylamino group) are dissolved in 200 parts of water at pH 7, 7.0 parts of sodium nitrite are added and after cooling to 5° 30 parts of hydrochloric acid (37 percent strength) are added all at once and the mixture is diazotised for 15' at 0°–5°. The clear diazonium salt solution is allowed to run into a solution of 10.8 parts of 4-methyl-phenol, 28 parts of sodium carbonate, 10 parts of sodium hydroxide and 300 parts of water at 5°, whilst stirring well. When the coupling is complete, the yellow dyestuff of the formula

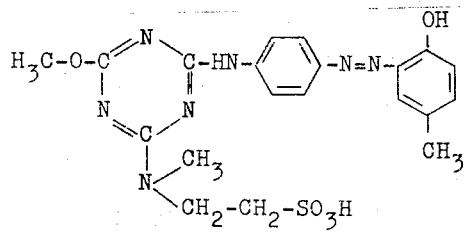

which has precipitated almost completely is filtered off and dried at 50°. It dyes polyamide fibres and polyamide fabrics from a weakly acid or neutral bath to give clear yellow shades of very good fastness to light.

Example 79

The condensation of methyl alcohol and 4-amino-2'-hydroxy-5'-methyl-1,1'-azobenzene with cyanuric chloride in stages 1 and 2 is carried out as described in Example 1. In stage 3, 18.7 parts of N-methylethanolamine are added, the mixture is heated to the boil (65°) and boiled for 1 hour under reflux, and the methyl alcohol is subsequently distilled off. The dyestuff which precipitates is filtered off, washed with water and well dried. Thereafter the yellow dyestuff is introduced into 140 parts of sulphuric acid (96 percent strength) and dissolved whilst stirring. After stirring for a further 4 hours at 25°C, the solution is poured out onto ice water and the dyestuff which precipitates, of the formula

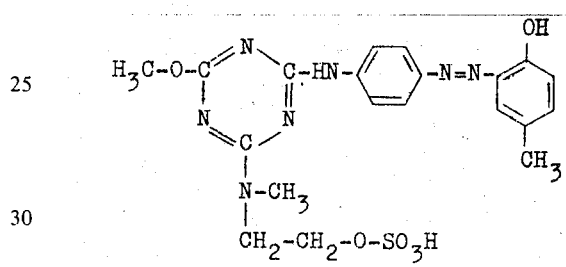

is filtered off and dried. It dyes polyamide fibres and polyamide fabrics from a weakly acid or neutral bath to give a yellow colour shade of very good fastness to light.

I claim:

1. Monoazo dyestuff, which in the form of the free acid, corresponds to the formula

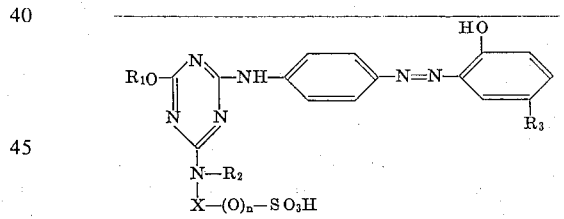

in which $R_1$ represents alkyl with 1 to 4 carbon atoms or alkyl with 1 to 4 carbon atoms substituted by hydroxyl, methoxy, ethoxy, chloro or bromo;

$R_2$ represents hydrogen or alkyl with 1 to 4 carbon atoms;

$R_3$ represents alkyl with 1 to 4 carbon atoms;

X represents alkylene with 1 to 4 carbon atoms and $n$ denotes 0 or 1.

2. Monoazo dyestuff, which in the form of the free acid, corresponds to the formula

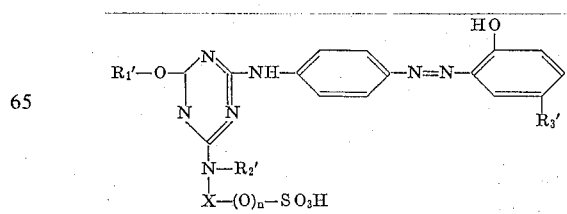

in which
- $R_1'$ represents methyl, ethyl, propyl, butyl or methoxy ethyl,
- $R_2'$ represents hydrogen, methyl, ethyl, propyl or butyl,
- $R_3'$ represents methyl or tert.-butyl,
- X denotes $C_1$–$C_4$-alkylene and
- n denotes 0 or 1.

3. Monoazo dyestuff of the formula

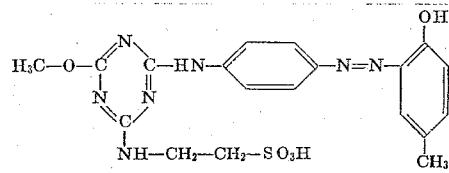

4. Monoazo dyestuff of the formula

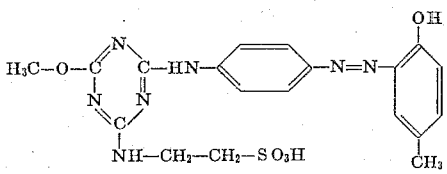

5. Monoazo dyestuff of the formula

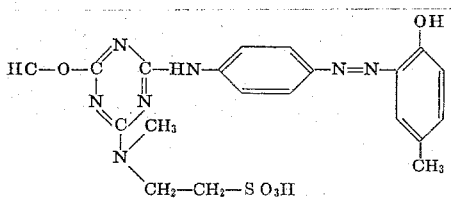

6. Monoazo dyestuff of the formula

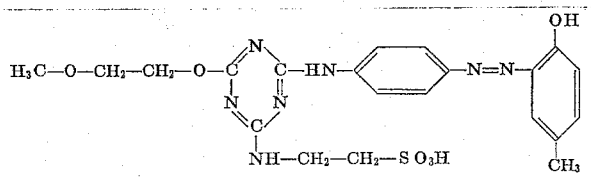

7. Monoazo dyestuff of the formula

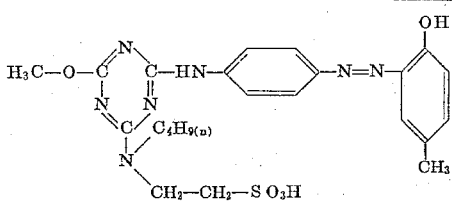

8. Monoazo dyestuff of the formula

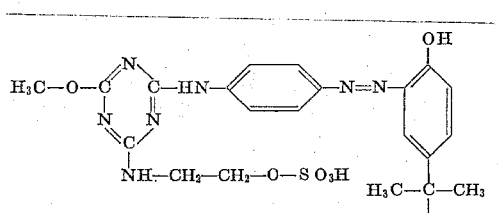

* * * * *